Feb. 12, 1924.
A. C. ROSENBROOK
1,483,314
INLET AND EXHAUST MANIFOLD
Filed May 11, 1921
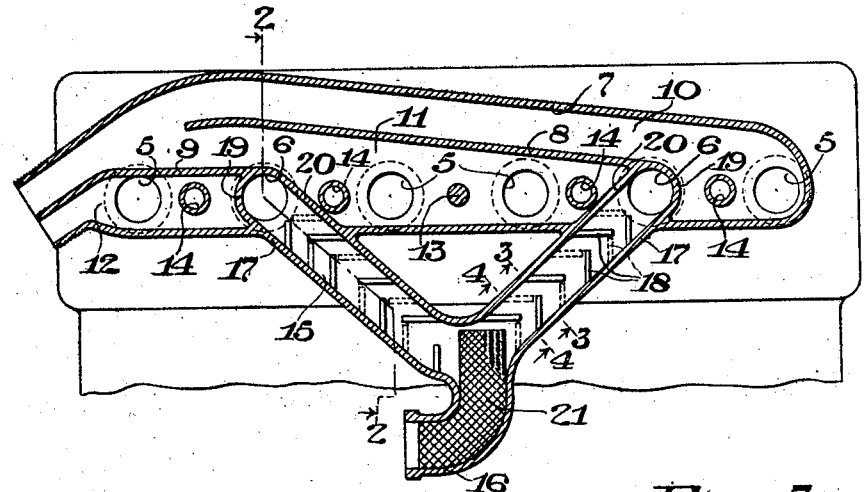
FIG. 1
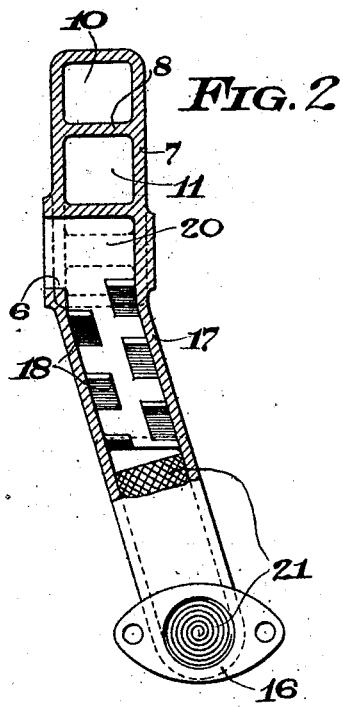
FIG. 2
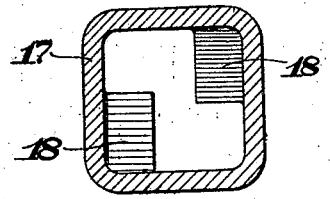
FIG. 3
FIG. 4
WITNESSES
C. L. Naal
H. D. Chase
INVENTOR
August Rosenbrook
By R. S. Caldwell
ATTORNEY

Patented Feb. 12, 1924.

1,483,314

UNITED STATES PATENT OFFICE.

AUGUST C. ROSENBROOK, OF MADISON, WISCONSIN.

INLET AND EXHAUST MANIFOLD.

Application filed May 11, 1921. Serial No. 468,539.

*To all whom it may concern:*

Be it known that I, AUGUST C. ROSENBROOK, a citizen of the United States, and resident of Madison, in the county of Wayne and State of Wisconsin, have invented new and useful Improvements in Inlet and Exhaust Manifolds, of which the following is a description, reference being had to the accompanying drawings, which are a part of this specification.

The invention relates to combination inlet-and-exhaust manifolds for internal combustion engines.

One of the objects of this invention is to provide a manifold in which an intimately mixed mixture of fuel and air from a cooler part of the manifold is caused to travel through a hotter part of the inlet manifold which is heated by the exhaust gases passing through the exhaust manifold. Particular attention in this design has been given to provide sufficient but not excessive heat to the mixture to produce efficient gasification without overheating, accompanied by pronounced agitation or turbulence while the mixture passes through the heated portion of the manifold. Provision has also been made for deflecting some of the exhaust gases away from the inlet conduit to prevent overheating and also to separate the streams of exhaust from the different cylinders to prevent back pressure.

The invention further consists in the several features hereinafter set forth and more particularly defined by claims at the conclusion hereof.

In the drawings: Fig. 1 is a vertical sectional view through a manifold embodying the invention; Fig. 2 is a section taken on the line 2—2 of Fig. 1; Fig. 3 is a section taken on the line 3—3 of Fig. 1; Fig. 4 is a section taken on the line 4—4 of Fig. 1.

The inlet-and-exhaust manifold is formed by a single casting having openings 5 communicating with the exhaust passages of the engine and openings 6 communicating with the inlet passages of the engine, the manifold here shown being applicable to a Ford motor.

The exhaust portion 7 of the manifold is provided with partitions 8 and 9 dividing it into passages 10, 11 and 12. The exhaust from the first cylinder passes through the passage 10, that from the second and third cylinders through the passage 11 and that from the fourth cylinder through the passage 12. From this it will be observed that the exhaust gases from the first and fourth cylinders are prevented from passing into the passage 11, and where the firing order of the engine is 1—2—4—3 this arrangement prevents back pressure since the exhaust valve of the third cylinder is not fully closed when exhaust from the first cylinder takes place and since the exhaust valve of the second cylinder is not fully closed when exhaust from the fourth cylinder takes place. A further reason for this splitting up of the exhaust gases is to allow only a small portion of the heat from the exhaust from the first and fourth cylinders to effect the inlet portion of the manifold, as hereinafter described. The exhaust portion of the manifold is provided with a transversely extending brace 13 and holes 14 receiving the usual fastening means.

In the inlet portion 15 of the manifold is a Y-shaped pipe having an elbow 16 at its lower end for attachment to the carburetor, and the upper ends only of the branches 17 are surrounded by the exhaust passages. To produce a turbulence in the mixture passing through the branches 17, I provide in each branch a series of baffle plates 18. The plates 18 are arranged in pairs with alternate pairs in staggered relation, as shown in Figs. 3 and 4, and extend from alternate upper and lower corners of the rectangular pipe forming the branch. These plates terminate short of the central portion of the pipe so that a stream of mixture passes through the central portion of the pipe, and the mixture passing along the sides of the pipe is given a zig-zag course which creates cross currents and turbulence throughout the whole stream passing through each branch. These plates 18 receive heat by conduction from the side walls of the inlet branch pipes, the plates at the upper ends of the branches being hottest. Thus the mixture is heated and agitated to produce a thorough vaporization by the time it reaches the inlet 6. The curved walls 19 adjacent the exhaust of the first and fourth cylinders and the inclined wall 20 adjacent the exhaust for the second and third cylinders are the hottest portions of the inlet manifold, and it will be observed that but a relatively small area is exposed to the heat from the exhaust of the first and fourth cylinders, due to the partitions 8 and 9.

In order to produce a thorough mixing of the air with the fuel and to prevent any liquid fuel passing to the branch sections. I provide a loosely rolled screen 21 extending from the elbow 16 up into the union between the branch sections so that any drops of liquid fuel are caught in the meshes of the screen and become attenuated, and in such condition are acted upon by the air passing into the inlet manifold so that such air will readily take up and mix with this attenuated fuel on its way to the engine. This screen also acts as a choke so that the velocity of the air is increased as it passes through the screen, and this has a further effect on the splitting up of any small particles of fuel in a liquid state.

I desire it to be understood that this invention is not to be limited to any specific form or arrangement of parts except in so far as such limitations are specified in the claims.

What I claim is:

1. A combined inlet-and-exhaust manifold comprising an exhaust housing communicating with the exhaust ports of the engine and inlet conduits leading to the admission ports of the engine and having their upper ends only subjected to direct heat from the exhaust, and partitions in said exhaust housing for directing a greater part of the exhaust from some of the cylinders away from the inlet conduits, said inlet conduits being provided with a series of baffle plates arranged in staggered relation and spaced from the center of the conduits to heat and produce turbulence in the mixture passing therethrough.

2. A combined inlet-and-exhaust manifold comprising an exhaust housing communicating with the exhaust ports of the engine and branch inlet conduits leading to the admission ports and having their upper ends only subjected to direct heat from the exhaust, and partitions in said exhaust housing for directing a greater part of the exhaust from some of the cylinders away from the inlet conduits, said inlet conduits having means for heating and producing turbulence in the mixture passing therethrough.

3. A combined inlet and exhaust manifold for four-cylinder internal combustion engines comprising an exhaust housing communicating with the exhaust ports of the engine, a branched inlet conduit communicating with the admission ports of the engine and having the upper ends only of its branches extending into the exhaust housing, a partition within the exhaust housing extending from one of the admission ports over the middle exhaust ports and beyond the other inlet port, another partition within the housing extending from the other inlet over the exhaust port at this end of the housing, said partitions directing a greater part of the exhaust from the end cylinders away from the inlet conduits.

4. A combined inlet and exhaust manifold for four-cylinder internal combustion engines comprising an exhaust housing communicating with the exhaust ports of the engine, a Y-shaped inlet conduit communicating with the admission ports of the engine and having the upper ends only of its branches extending into the exhaust housing, a partition within the exhaust housing extending from one of the admission ports over the middle exhaust ports and beyond the other inlet port, another partition within the housing extending from the other inlet over the exhaust port at this end of the housing, said partitions directing a greater part of the exhaust from the end cylinders away from the inlet conduits, each branch of the inlet conduit having means for supplying heat to and producing turbulence in the mixture passing therethrough.

In testimony whereof, I affix my signature.

AUGUST C. ROSENBROOK.